US012776665B2

(12) United States Patent
Paz et al.

(10) Patent No.: US 12,776,665 B2
(45) Date of Patent: Oct. 27, 2026

(54) OVER CURRENT PROTECTION FOR WIRELESS POWER DEVICES

(71) Applicant: Renesas Electronics America Inc., Milpitas, CA (US)

(72) Inventors: Herman Ramirez Paz, Tempe, AZ (US); Adnan Dzebic, Oakland, CA (US)

(73) Assignee: Renesas Electronics America Inc., San Jose, CA (US)

(*) Notice: Subject to any disclaimer, the term of this patent is extended or adjusted under 35 U.S.C. 154(b) by 0 days.

(21) Appl. No.: 19/095,266

(22) Filed: Mar. 31, 2025

(65) Prior Publication Data

US 2025/0309692 A1 Oct. 2, 2025

Related U.S. Application Data

(60) Provisional application No. 63/572,558, filed on Apr. 1, 2024.

(51) Int. Cl.

| | |
|---|---|
| ***H02J 50/12*** | (2016.01) |
| ***H02J 50/80*** | (2016.01) |
| ***H02M 1/00*** | (2007.01) |
| ***H02M 1/36*** | (2007.01) |

(52) U.S. Cl.

CPC .............. *H02J 50/12* (2016.02); *H02J 50/80* (2016.02); *H02M 1/0009* (2021.05); *H02M 1/36* (2013.01)

(58) Field of Classification Search

CPC ............ H02J 50/10; H02J 50/12; H02J 50/80; H02M 1/36; H02M 1/0009

USPC .......................................................... 307/104

See application file for complete search history.

(56) References Cited

U.S. PATENT DOCUMENTS

2016/0043590 A1* 2/2016 Ha .......................... H02J 50/12 320/108

* cited by examiner

*Primary Examiner* — Hal Kaplan

(74) *Attorney, Agent, or Firm* — SCULLY, SCOTT, MURPHY & PRESSER, P.C.

(57) ABSTRACT

Systems and methods for implementing over current protection for wireless power devices is described. The method can include receiving alternating current (AC) power from a wireless power transmitter. Rectifying the AC power into a rectified voltage. Generating an output voltage using the rectified voltage. Determining whether an output current of the output voltage can be within a range of current values. In response to output current being within the range of current values, regulating the rectified voltage to a level that minimizes a difference between the rectified voltage and the output voltage. In response to output current being outside of the range of current values, determining whether output current can be greater than or less than an upper bound of the range of current values. In response to the output current being greater than the upper bound of range of current values, shutting down the wireless power transfer system.

20 Claims, 8 Drawing Sheets

212

OVER CURRENT PROTECTION FOR WIRELESS POWER DEVICES

BACKGROUND

The present disclosure relates in general to apparatuses and methods for over-current protection for wireless power devices. Particularly, over-current protection that can be performed by wireless devices during wireless charging.

Wireless power transfer can be implemented in various electronic devices to enable convenient and cable-free charging. Wireless charging systems typically include a power transmitter and a power receiver, each incorporating inductive or resonant coupling components. The transmitter may be integrated into a charging pad, stand, or other charging surface, while the receiver may be embedded in a portable device, such as a smartphone, smartwatch, or other battery-powered electronics. When the receiver is placed in proximity to the transmitter, their respective coils can establish an inductive or resonant link, allowing alternating current (AC) power to be transferred wirelessly. The received AC power can then be converted into direct current (DC) power to charge a battery or power internal circuitry of the receiving device.

SUMMARY

In one embodiment, a method for over current protection for wireless power devices is generally described. The method can include receiving alternating current (AC) power from a wireless power transmitter. The method can further include rectifying the AC power into a rectified voltage. The method can further include generating an output voltage using the rectified voltage. The method can further include determining whether an output current of the output voltage can be within a range of current values. The method can further include, in response to the output current being within the range of current values, regulating the rectified voltage to a level that minimizes a difference between the rectified voltage and the output voltage. The method can further include, in response to the output current being outside of the range of current values, determining whether the output current can be greater than or less than an upper bound of the range of current values. The method can further include, in response to the output current being greater than the upper bound of range of current values, shutting down the wireless power transfer system.

In one embodiment, an integrated circuit for over current protection for wireless power devices is generally described. The integrated circuit can include a controller. The integrated circuit can further include a circuit configured to receive alternating current (AC) power from a wireless power transmitter. The circuit is further configured to rectify the AC power into a rectified voltage. The circuit is further configured to generate an output voltage using the rectified voltage. The controller is configured to determine whether an output current of the output voltage is within a range of current values. The controller is further configured to, in response to the output current being within the range of current values, regulate the rectified voltage to a level that minimizes a difference between the rectified voltage and the output voltage. The controller is further configured to, in response to the output current being outside of the range of current values, determine whether the output current is greater than or less than an upper bound of the range of current values. The controller is further configured to, in response to the output current being greater than the upper bound of range of current values, shut down a wireless power transfer system that includes the wireless power transmitter.

In one embodiment, a device for over current protection for wireless power devices is generally described. The device can include a transmitter. The device can further include a receiver. The receiver can include a controller. The receiver can further include a circuit configured to receive alternating current (AC) power from a wireless power transmitter. The circuit can further be configured to rectify the AC power into a rectified voltage. The circuit can further be configured to generate an output voltage using the rectified voltage. The controller is configured to determine whether an output current of the output voltage is within a range of current values. The controller is further configured to, in response to the output current being within the range of current values, regulate the rectified voltage to a level that minimizes a difference between the rectified voltage and the output voltage. The controller is further configured to, in response to the output current being outside of the range of current values, determine whether the output current is greater than or less than an upper bound of the range of current values. The controller is further configured to, in response to the output current being greater than the upper bound of range of current values, shut down the wireless power transfer system.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

The present disclosure relates in general to apparatuses and methods for over current protection in wireless power devices.

Wireless power transfer can occur between two devices. Such wireless power systems can include a transmitter having a transmission coil and a receiver having a receiver coil. In an aspect, the transmitter may be connected to a structure including a wireless charging region. In response to a device including the receiver being placed near a device including the transmitter, the transmission coil and the receiver coil can be inductively coupled with one another to establish a communication link between the transmitter and the receiver and inductive transfer of alternating current (AC) power can occur using the established communication link. The transfer of AC power, from the transmitter to the receiver, can facilitate charging of a battery of the device including the receiver.

Wireless charging systems, such as those based on the Qi standard, can provide charging under various modes and power levels. These modes can include a standard power transfer mode, which provides a consistent power level, and an extended power transfer mode, which supports higher power levels. In Qi wireless charging systems, the transmitter and receiver can communicate with each other using a specific communication protocol defined by the standard. This communication protocol allows the devices to negotiate the power transfer mode and regulate the power transfer process. The communication between the devices is typically achieved by modulating the wireless power signal itself. For example, the Qi standard uses an amplitude-shift keying (ASK) modulation technique to transmit data between the transmitter and receiver. The transmitter can demodulate the incoming signal to extract the communicated data and respond accordingly.

Figure 1:
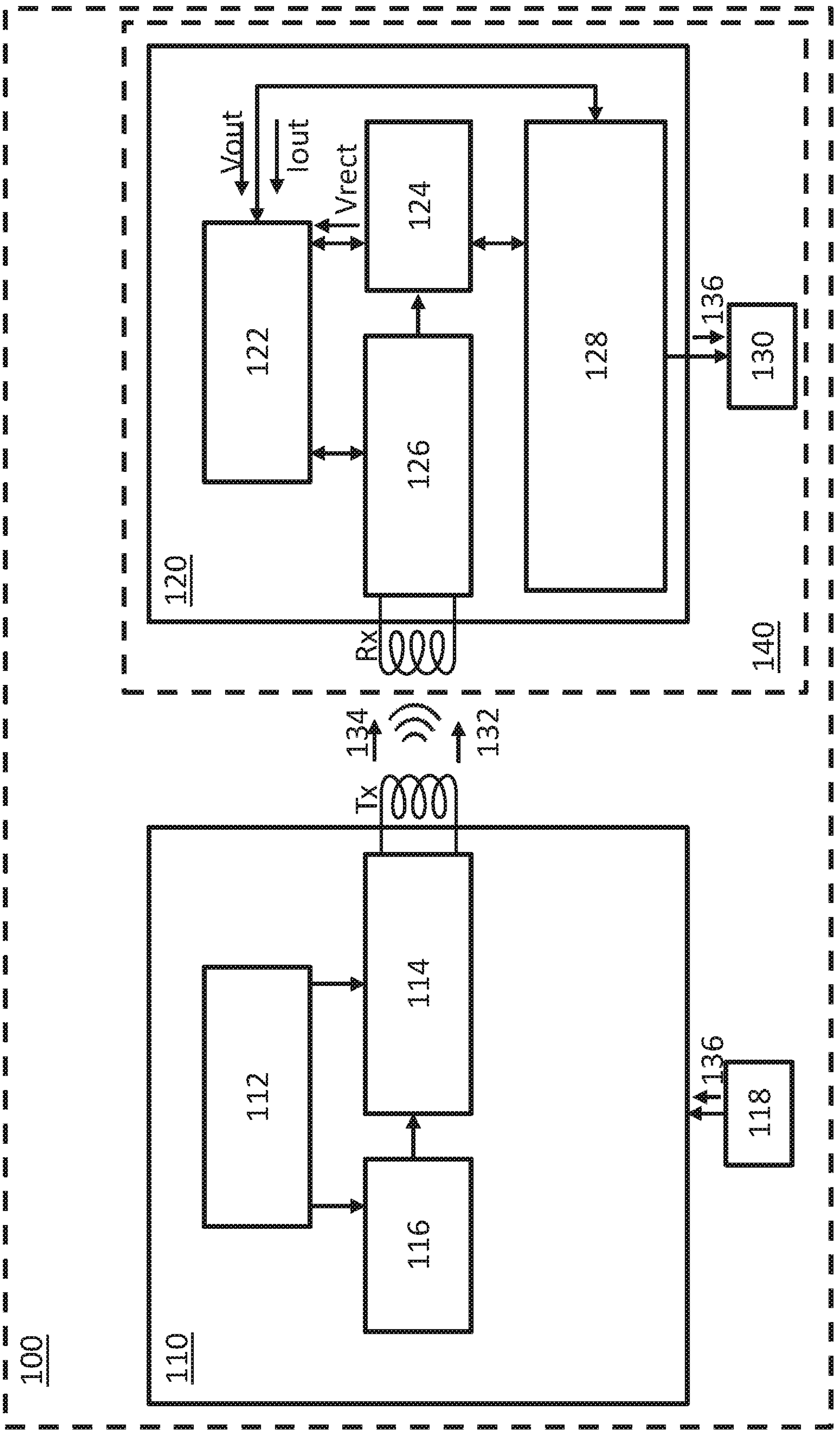
FIG. 1 is a diagram showing an example system that can implement over current protection in wireless power devices.

FIG. 1 is a diagram showing an example system that can implement over current protection in a wireless power transfer system in one embodiment. System 100 can include power devices, such as a transmitter 110 and a receiver 120, that are configured to wirelessly transfer power and data therebetween via inductive coupling. Transmitter 110 can be referred to as a wireless power transmitter and receiver 120 can be referred to as a wireless power receiver.

Transmitter 110 can be configured to receive power from one or more power supplies and to transmit AC power to receiver 120 wirelessly. For example, transmitter 110 can be configured for connection to a power supply 118 such as, e.g., an adapter or a DC power supply. Transmitter 110 can be a semiconductor device including a controller 112, a resonant circuit 114, and a switching converter 116. Switching converter 116 can be an integrated circuit (IC), that can be a part of a power driver, configured to convert one type of electric current into another type of electric current. By way of example, switching converter 116 can be configured as an inverter to convert a DC signal into an AC signal.

Controller 112 can be configured to control and operate switching converter 116, resonant circuit 114, and other components of transmitter 110. Controller 112 can include, for example, a processor, central processing unit (CPU), field-programmable gate array (FPGA) or any other circuitry that is configured to control and operate switching converter 116. While described as a CPU in illustrative embodiments, controller 112 is not limited to a CPU in these embodiments and may comprise any other circuitry that is configured to control and operate switching converter 116. In an example embodiment, controller 112 can be configured to control switching converter 116 to drive the resonant circuit 114 to produce a magnetic field. Switching converter 116 can drive coil TX at a range of frequencies and configurations defined by wireless power standards, such as, e.g., the Wireless Power Consortium (WPC) standards. The resonant circuit 114 can include a coil TX and one or more capacitors, inductors, resistors, that can form circuitry for outputting ASK signal 132 and conveying AC power 134 to the receiver 120.

Receiver 120 can be configured to receive AC power 134 transmitted from transmitter 110 and to supply the power to one or more loads 130 or other components of a destination device that includes receiver 120. Load 130 may comprise, for example, a battery charger that is configured to charge a battery of the destination device 140, a display, or other electronic components of the destination device 140, or any other load of the destination device 140. A destination device can include receiver 120 and can be, for example, a computing device, smart device, wearable device or any other electronic device that is configured to receive power wirelessly. In other embodiments, receiver 120 may be separated from a destination device and connected to the destination device via a wire or other component that is configured to provide power to destination device 140.

Receiver 120 can be a semiconductor device including a controller 122, a resonant circuit 126, a switching converter 124 and a power management integrated circuit (PMIC) 128. Controller 122 can be an integrated circuit including, for example, a digital controller such as a microcontroller, a processor, CPU, FPGA or any other circuitry that may be configured to control and operate switching converter 124 and PMIC 128. Resonant circuit 126 can include a coil RX and one or more capacitors, inductors, resistors, that can form circuitry for receiving ASK signal 132 and conveying AC power 134, from transmitter 110. Switching converter 124 can be an IC configured to convert one type of electric current into another type of electric current. By way of example, switching converter 124 can be configured as a power rectifier to convert an AC signal into a DC signal. Power switching converter 124, when configured as a power rectifier, can include a rectifier circuit such as half-bridge rectifiers, full bridge rectifiers, or other types of rectifier circuits that can be configured to rectify power received via resonant coil RX of resonant circuit 126 into a power type as needed for load 130. PMIC 128 can be configured to regulate and distribute the power received from transmitter 110 to other components in destination device 140 such as the load 130 as DC power 136. PMIC 128 can include circuits and components such as low-dropout regulators (LDO) and or converters to help regulate and manage power in the receiver 120. Controller 122 can be configured to receive a voltage Vrect outputted by switching converter 124. Controller 122 can be configured to receive output voltage Vout and output current Iout outputted by PMIC 128. To be described in more detail below, controller 122 can be configured to execute application specific programs and/or firmware to control and operate various components, such as resonant circuit 126, switching converter 124, and PMIC 128 of receiver 120.

As an example, when receiver 120 is placed in proximity to transmitter 110, the magnetic field produced by coil TX of resonant circuit 114 and switching converter 116 induces a current in coil RX of resonant circuit 126. The induced current causes AC power 134 to be inductively transmitted to switching converter 124, via resonant circuit 126. Switching converter 124 receives AC power 134 and converts AC power 134 into DC power 136. DC power 136 is then provided to load 130.

Transmitter 110 and receiver 120 are also configured to exchange information or data, e.g., messages, via the inductive coupling of a power driver and resonant circuit 114 and 126. For example, before transmitter 110 begins transferring power to receiver 120, a power contract may be agreed upon and created between receiver 120 and transmitter 110. For example, receiver 120 may send ASK signals 132 or other data to transmitter 110 that indicate power transfer information such as, e.g., an amount of power to be transferred to receiver 120, commands to increase, decrease, or maintain a power level of AC power 134, commands to stop a power transfer, or other power transfer information. In another example, in response to receiver 120 being brought in proximity to transmitter 110, e.g., close enough such that a transformer may be formed by coil TX and coil RX to allow power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place. Transmitter 110 and receiver 120 may transmit and receive ASK signal 132, data or other information via the inductive coupling of coil TX and coil RX.

In conventional wireless charging systems, the receiver's hardware over-current protection (OCP) is designed to safeguard against excessive current draw and short circuit conditions. However, the current implementation of hardware OCP in receivers can lead to voltage foldback, where the output voltage Vout decreases as the load increases. If left unchecked, this voltage foldback can result in high energy dissipation across the main low dropout regulator (MLDO), causing thermal overstress and potentially weakening or damaging the integrated circuit (IC) prematurely. Abrupt system shutdown may occur when the OCP condition is not addressed in a timely manner which can create interruptions, e.g., when a user is charging the device.

To mitigate the risks associated with voltage foldback and thermal overstress using hardware OCP, the wireless charging system 100 can implement a firmware-based solution. Controller 122 can be configured to detect an over-current condition and, in response, trigger a soft OCP operation before the hardware OCP threshold is reached. A soft OCP operation and threshold can limit and/or regulate the output current Iout between a predefined overcurrent threshold that triggers the soft OCP operation and the output current Iout's maximum operating range, effectively regulating Iout and system power based on the rectified voltage Vrect. This change in system operation can ensure that the MLDO remains in dropout mode, maintaining a constant difference between Vrect and Vout. By keeping the Vrect to Vout spread constant, the soft OCP operation mitigates thermal stress on the MLDO and prevents premature IC damage. When the output current Iout returns below the soft OCP threshold, the system can resume normal operation without interruption to charging experience for the user. Notably, the system can operate continuously during over-current conditions where output current levels remain between the soft OCP threshold and the hard OCP threshold. During these conditions, dynamic adjustments are performed by the controller 122 to maintain safe and efficient power transfer without unnecessary interruption. Therefore, shutdown can be selectively performed when necessary, i.e., if measured output current or die temperature exceeds predefined upper bounds.

Figure 2A:
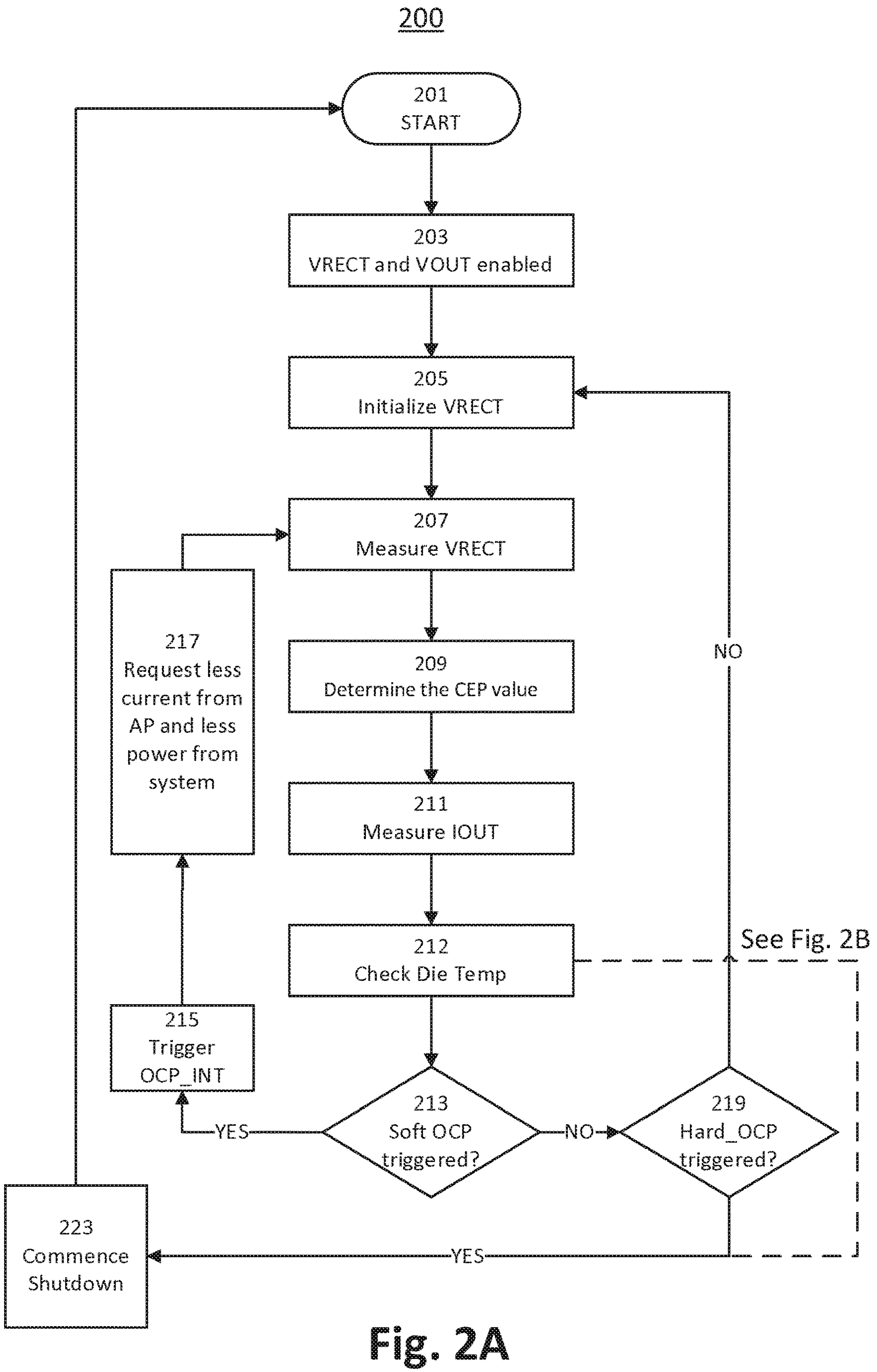
FIG. 2A is a flowchart illustrating a process to implement over current protection in wireless power devices.
Figure 2B:
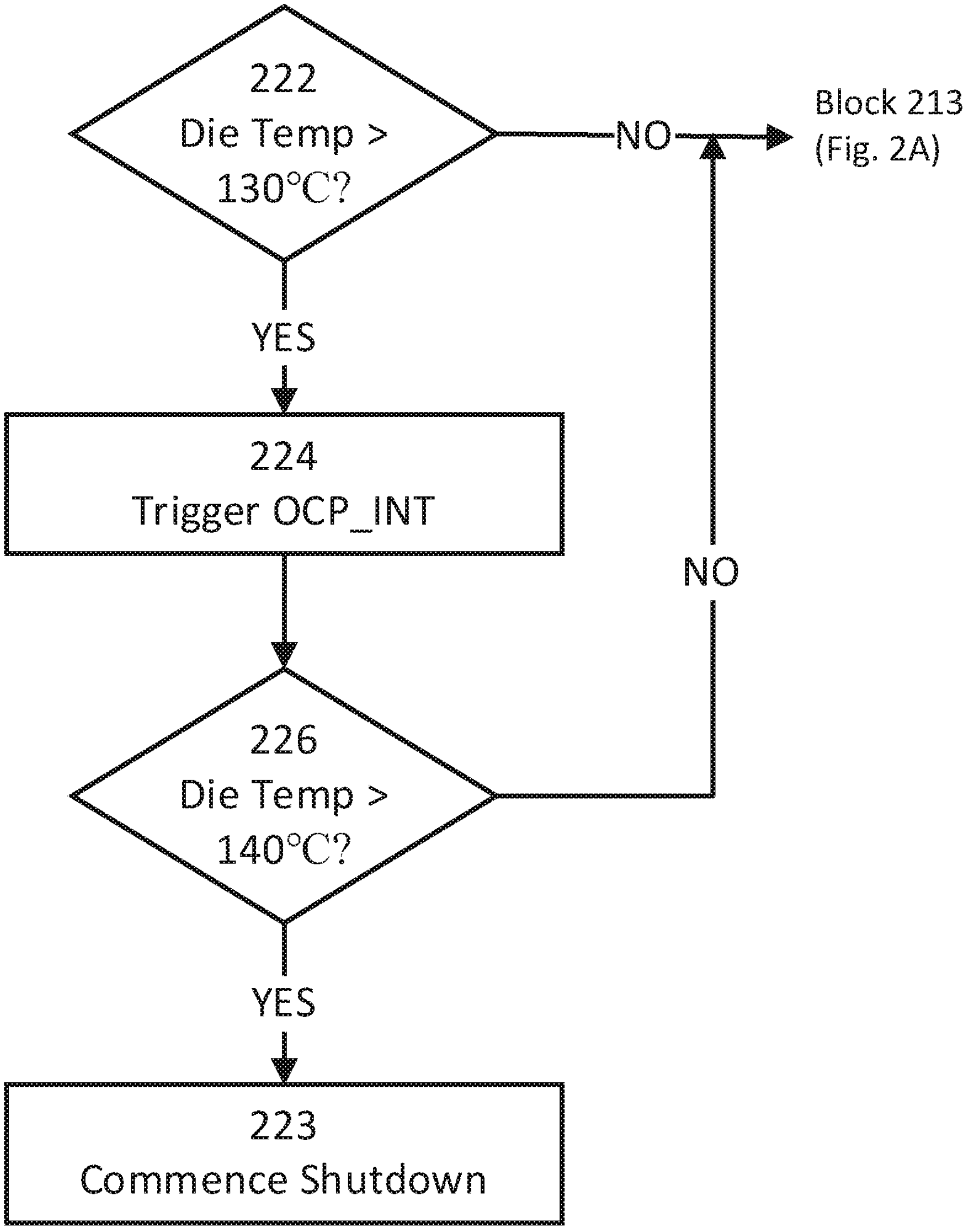
FIG. 2B is a flowchart illustrating the check die temperature process implementing over current protection in wireless power devices.
Figure 2C:
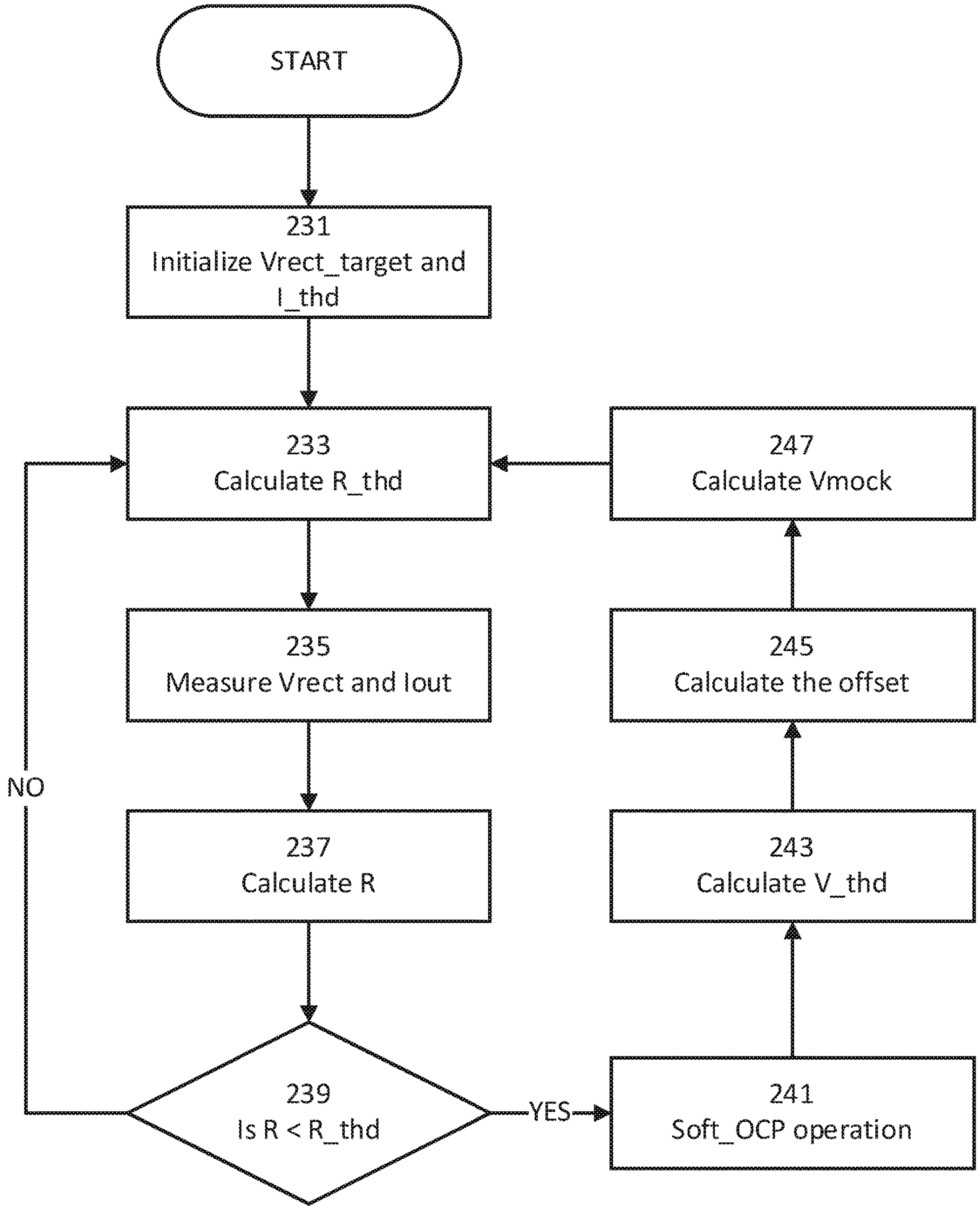
FIG. 2C is a flowchart illustrating the determine the Control Error Packet (CEP) value process implementing over current protection in wireless power devices.

FIG. 2A to FIG. 2C are flow diagrams illustrating a process to implement over current protection in wireless power devices. The process 200 can include one or more operations, actions, or functions as illustrated by one or more of blocks 201, 203, 205, 207, 209, 211, 212, 213, 215, 217, 219, 222, 223, 224, 226, 231, 233, 235, 237, 239, 241, 243, 245, and 247. Although illustrated as discrete blocks, various blocks can be divided into additional blocks, combined into fewer blocks, eliminated, performed in different order, or performed in parallel, depending on the desired implementation. Descriptions of FIG. 2A to FIG. 2C may reference components shown in FIG. 1.

The process 200 to implement over current protection can begin at block 201 to start. Process 200 can continue from block 201 to block 203. At block 203, system 100 can be in the process of transferring power from the transmitter 110 to the receiver 120. For example, both the rectified voltage Vrect and output voltage Vout are active within the system 100 and the PMIC 128 is enabled to provide power received from the transmitter 110 to the load 130 of a destination device 140. Process 200 can continue from block 203 to block 205. At block 205, rectified voltage Vrect can be initialized to the system's target voltage e.g., 12 V or 14 V (Volts). This ensures that the power transfer starts at an optimum voltage level for stable system operation.

Process 200 can continue from block 205 to block 207. At block 207, rectified voltage can be measured. Controller 122 can be configured to measure the rectified voltage Vrect. The measured Vrect can be used by controller 122 as feedback information to monitor and regulate the Vrect. Process 200 can continue from block 207 to block 209. At block 209, control error packet (CEP) values are determined. Using the measured Vrect value, transmitter 110 and receiver 120 can communicate the error difference between the target Vrect and the measured Vrect using CEPs. The CEP values can be used to understand how the output current Iout and output voltage Vout need to be regulated to stay at the system's target voltage. To be described in more detail below, while calculating CEP values, controller 122 can have Vrect regulated while being able to adjust Vrect parameters based on measured output current and system impedance.

Process 200 can continue from block 209 to block 211. At block 211, output current Iout can be measured. Process 200 can continue from block 211 to block 212. At block 212, controller 122 can check the temperature of the die. To be described in more detail below, the die temperature can be checked to determine if any circuitry is overheating past a certain temperature threshold. Process 200 can continue from block 212 to block 213. At block 213, a determination of whether the output current Iout has triggered the soft OCP or not is made. Controller 122 can monitor whether the output current Iout rises above the soft OCP threshold and/or the hard OCP threshold. In an example embodiment, controller 122 can be configured to determine if the output current Iout is greater than or equal to the soft OCP threshold, such as 1.5 A (Amperes), and is less than the hard OCP threshold, such as 2 A.

If the output current Iout is greater than 1.5 A and less than 2 A, then process 200 can continue from block 213 (213: YES) to block 215. At block 215, the OCP interrupt signal OCP_INT is triggered. The trigger can inform controller 122 to respond to the over current condition and act accordingly. Process 200 can continue from block 215 to block 217. At block 217 controller 122 can be configured to request less current and less power from the transmitter 110. Using the information based on the determined CEP values, controller 122 can determine the necessary adjustments to regulate the power transfer. For example, if the CEP value is positive (i.e., the measured Vrect is higher than the target Vrect), the receiver 120 can request the transmitter 110 to reduce the current and power being transferred by a certain amount. Limiting the current and power being transferred can regulate Vrect and prevents the output current Iout from triggering a complete shutdown of the system. The avoidance of the complete shutdown allows the system to operate continuously during over-current conditions where output current levels remain between the soft OCP threshold and the hard OCP threshold, leading to maintenance of safe and efficient power transfer without unnecessary interruptions. After the system is regulated, process 200 can return back to measuring Vrect at block 207 to continue regulating Vrect.

If the output current Iout is less than 1.5 A or greater than 2 A, then process 200 can continue from block 213 (213:NO) to block 219. At block 219, a determination of whether the output current Iout has triggered the hard OCP or not is made. Controller 122 can be configured to determine if output current Iout is greater than or equal to 2 A. If output current Iout is less than 2 A, then process 200 can continue from block 219 (219:NO) to block 205 to reinitialize Vrect to the system target. If output current Iout is greater than or equal to 2 A, then process 200 can continue form block 219 (219:YES) to block 223 to commence shutdown the of the system. Since the hard OCP threshold has been triggered for the output current being over 2 A, system 100 needs to be shutdown to prevent any damage to the system components. Process 200 can return from block 223 back to block 201 to await the commencement of power transfer again.

FIG. 2B is a flow diagram illustrating the check die temperature process 212 included in process 200 shown in FIG. 2A. The check die temperature process 212 can begin at block 222. At block 222, controller 122 can determine if the measured die temperature is less than or greater than a temperature threshold Tth1, such as 130° C. If the die temperature is less than the temperature threshold Tth1, such as 130° C., then the process 200 can return from block 222 (222:NO) back to continue process 200 and proceed to block 213. If the die temperature is greater than the temperature threshold Tth1, such as 130° C., then the process 200 can continue from block 222 (222:YES) to 224. At block 224, the OCP interrupt (OCP_INT I) signal is triggered. Process 200 can continue from block 224 to block 226. At block 226, controller 122 can determine if the measured die temperature is less than or greater than another temperature threshold Tth2 that is greater than Tth1, such as 140° C. If the die temperature is less than Tth2, controller 122 can return back (226:NO) to continue process 200 and proceed to block 213. If the die temperature is greater than Tth2, then process 200 can continue from block 226 (226:YES) to block 223 to commence shutdown of system 100.

FIG. 2C is a flow diagram showing details of block 209 of process 200 to implement over current protection in wireless power devices. To determine the CEP value, process 200 can proceed to block 231. At block 231, a target rectified voltage Vrect_target and output current threshold I_thd is initialized. In one example embodiment, the Vrect_target is initialized as 14 V and I_thd is 1.5 A. The I_thd is a current value that is less than the hard OCP threshold value and can be the value to trigger the soft OCP operation. Process 200 can continue from block 231 to block 233. At block 233, a resistance threshold R_thd is determined. Using the I_thd value and Vrect_target value, the R_thd can be the quotient of the two values (Vrect_target/I_thd=R_thd). Process 200 can continue from block 233 to block 235. At block 235, the controller 122 can measure the rectified voltage Vrect and output current Iout. Process 200 can continue from block 235 to block 237. At block 237, controller 122 can determine a measured resistance by determining the quotient of the measured rectified voltage Vrect and output current Iout (Vrect/Iout=R). Process 200 can continue from block 237 to block 239. At block 239, controller 122 can determine whether the measured resistance R is greater than or less than the resistance threshold R_thd.

If the measured resistance R is greater than the threshold resistance R_thd, then process 200 can continue from block 239 (239:NO) to block 233. Upon the return to block 233, the controller 122 can determine R_thd again, proceed to block 235 to remeasure Vrect and Iout at block 235 again and proceed to block 237 to determine a new value of R using the remeasured Vrect and Iout. Then, controller 122 can process the decision block 239 using the new value of R. If the measured resistance R is less than the threshold resistance R_thd, process 200 can continue from block 239 (239:YES) to block 241. At block 241, the system can begin the soft OCP operation. Controller 122 can enable the soft OCP operation to start. Process 200 can continue from block 241 to block 243. At block 243, a threshold voltage V_thd is determined. Threshold voltage V_thd can be the maximum voltage needed for system 100 to function under fault/stress conditions. The threshold voltage V_thd can be the product of the measured resistance R and the threshold current (V_thd=I_thd*R). Process 200 can continue from block 243 to block 245. At block 245, the offset between the target rectified voltage Vrect_target and the threshold voltage V_thd is determined. The difference between Vrect and Vthd is the offset value and is used as the determined CEP value.

Process 200 can continue from block 245 to block 247. At block 247, controller 122 can determine a mock Vrect target Vmock. The mock Vrect target Vmock can be the difference between a current value of Vrect_target and the determined offset (Vmock=Vrect_target−offset). Process 200 can return from block 247 to block 233, where controller 122 can replace the Vrect_target that was previously used for determining R_thd with the mock Vrect target Vmock. Controller 122 can determine a new value of R_thd using Vmock and I_thd in block 233. By replacing Vrect_target with Vmock, controller 122 can use a relatively lower target Vrect to regulate Vrect such that Vrect can be maintained within the range between the soft OCP threshold and the hard OCP threshold.

Figure 3:
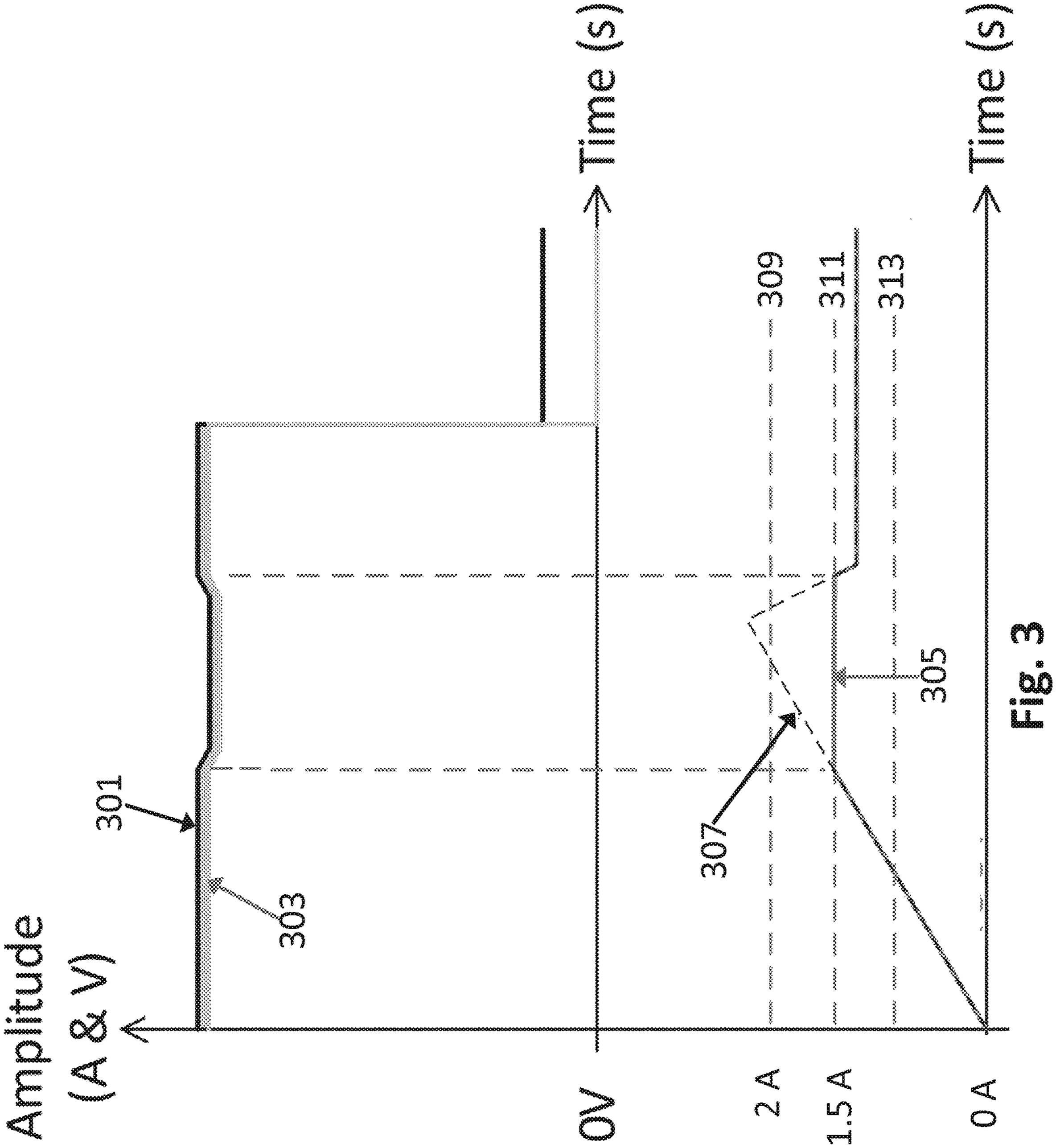
FIG. 3 is a diagram illustrating waveforms of an implementation of over current protection in a wireless power device in one example embodiment.

FIG. 3 is a diagram illustrating waveforms of an implementation of over current protection in a wireless power device in one example embodiment. Descriptions of FIG. 3 may reference components shown in FIG. 1 and FIG. 2. The diagram in FIG. 3 illustrates an example embodiment of a wireless power receiver, such as receiver 120, implementing over current protection. The diagram shows the relationship between a current amplitude (A) and voltage amplitude (V) against time(s). Waveform 301 illustrates the rectified voltage Vrect. Waveform 303 illustrates the output voltage Vout. Waveform 305 illustrates the output current Iout. Waveform 307 represents output current Iout without the implementation of the soft OCP operation and trigger. Waveform 309 represents the threshold for the hard OCP operation. In this example embodiment the hard OCP threshold is at 2 A. Waveform 311 represents the threshold for the soft OCP operation. In this example embodiment, the soft OCP threshold is at 1.5 A. Waveform 313 represents the maximum of the operating range of output current Iout.

In this example embodiment, the output current 305 is increasing while system 100 is still regulating output voltage Vout in dropout mode. Without a soft OCP trigger implemented, as seen in waveform 307, the output current represented by waveform 307 increases until it rises above hard OCP trigger 309. The output current may continue increasing while reducing the output voltage Vout caused by the hard OCP operation being triggered. With a soft OCP trigger and operation implemented, as seen in waveform 305, the output current represented by waveform 305 would be limited to the soft OCP threshold 311. When the output current represented by waveform 305 reached the soft OCP threshold 311, the soft OCP operation is triggered. The soft OCP operation allows receiver 120 to maintain the output current represented by waveform 305 between the soft OCP threshold 311 and the maximum of the operating range of Iout, thus preventing the difference between Vrect and Vout from increasing to an undesirable level and preventing thermal stress from increasing.

Figure 4:
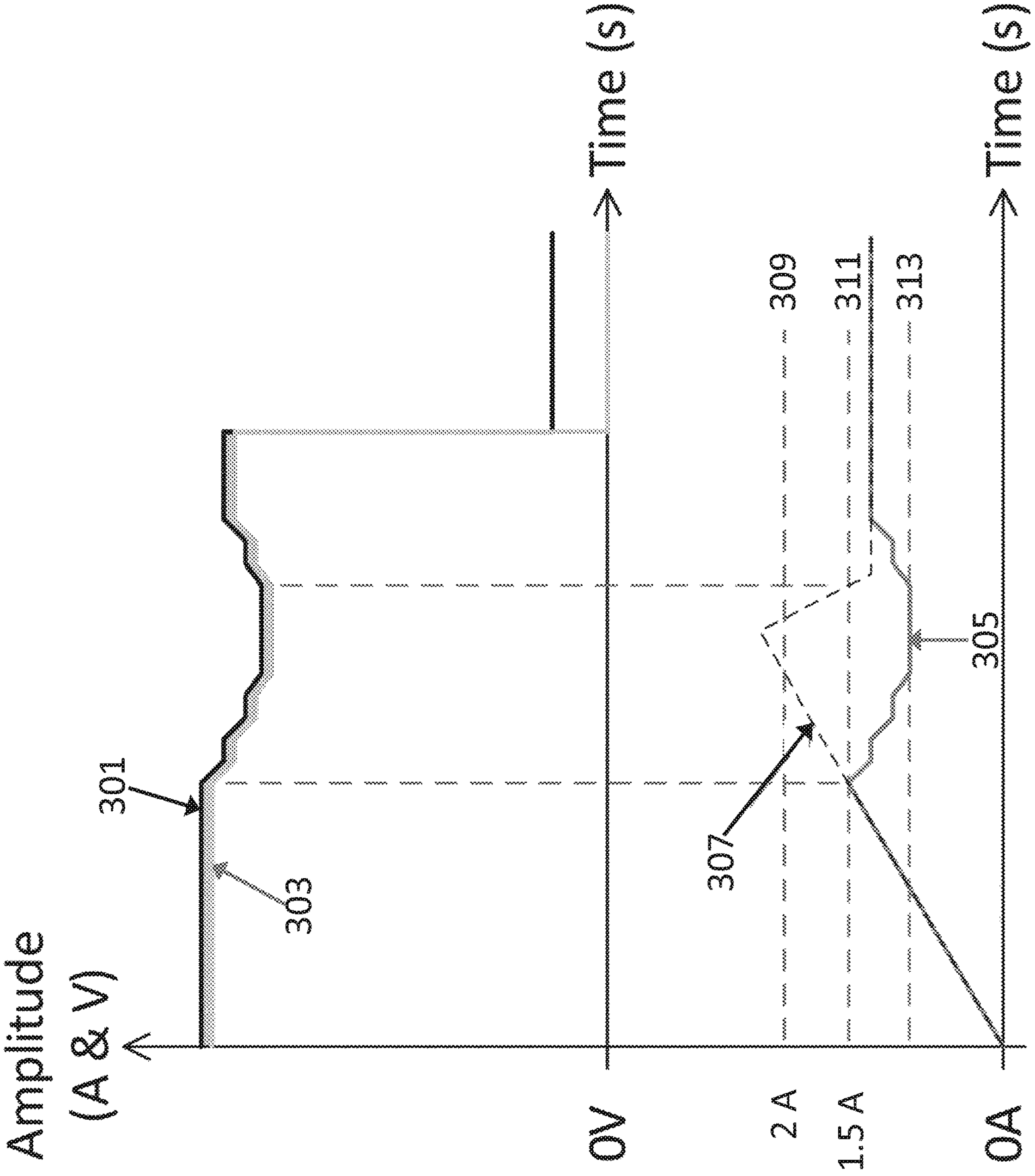
FIG. 4 is a diagram illustrating waveforms of another implementation of over current protection in a wireless power device in one example embodiment.

FIG. 4 is a diagram illustrating an implementation of over current protection in a wireless power device in one example embodiment. Descriptions of FIG. 4 may reference components shown in FIG. 1 to FIG. 3. The diagram in FIG. 4 illustrates an example embodiment of a wireless power receiver, such as receiver 120, implementing over current protection. The diagram shows the relationship between a current amplitude (A) and voltage amplitude (V) against time(s). In this example embodiment, the output current represented by waveform 305 is increasing while receiver 120 is still regulating output voltage 303 in dropout mode. Without a soft OCP trigger implemented, as seen in waveform 307, the output current represented by waveform 307 increases until it rises above hard OCP trigger represented by waveform 309. The output current may continue increasing while reducing the output voltage Vout caused by the hard OCP operation being triggered. With a soft OCP trigger and operation implemented, as seen in waveform 305, the output current represented by waveform 305 would be limited to be under the soft OCP threshold 311. Here, the output current represented by waveform 305 can be limited and lowered various times within the maximum operating range 313. When the output current represented by waveform 305 reached the soft OCP threshold 311, the soft OCP operation is triggered. The soft OCP operation allows receiver 120 to maintain the output current represented by waveform 305 between the soft OCP threshold 311 and the maximum of the operating range of Iout, thus preventing the difference between Vrect and Vout from increasing to an undesirable level and preventing thermal stress from increasing.

Figure 5:
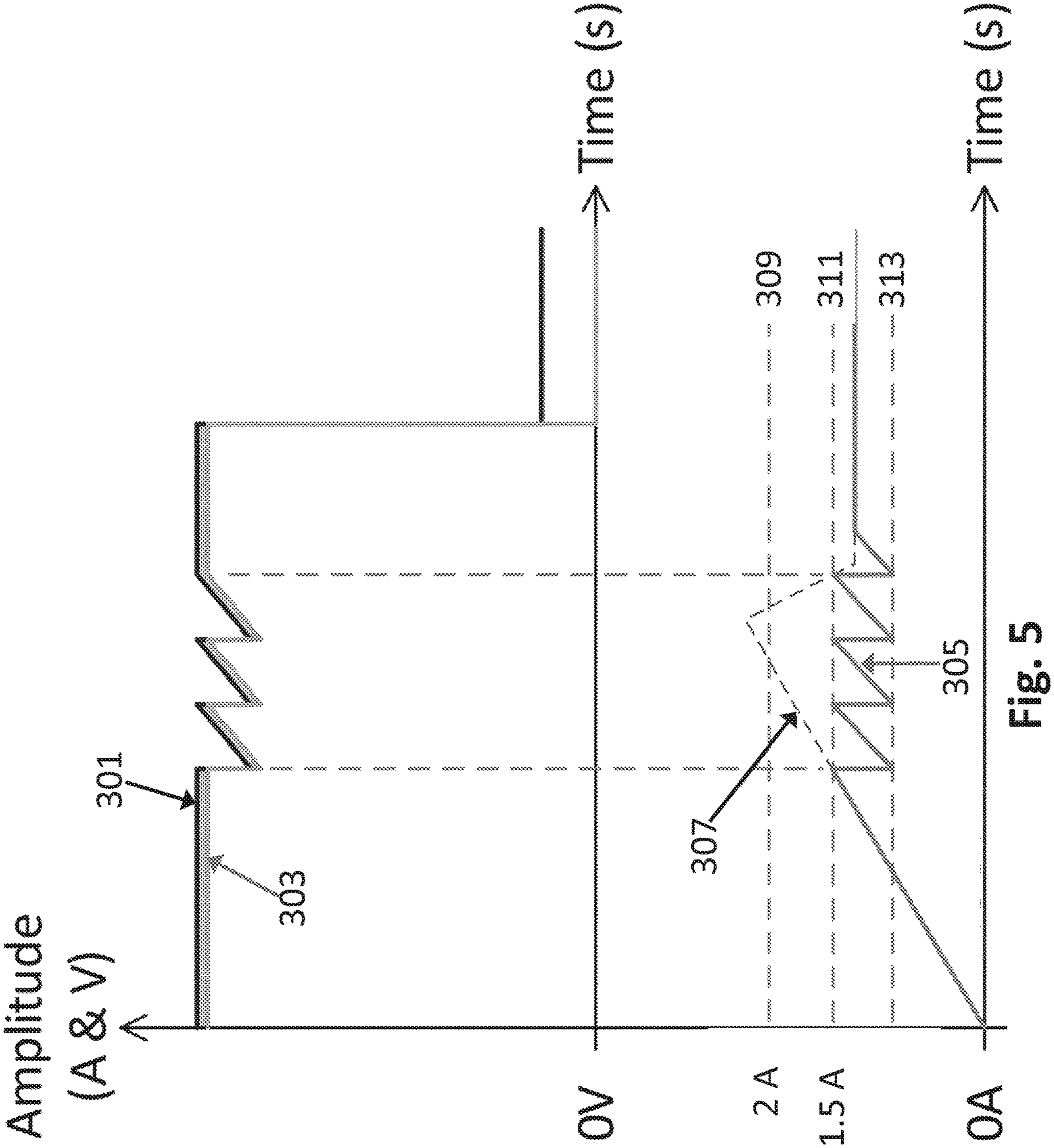
FIG. 5 is a diagram illustrating waveforms of another implementation of over current protection in a wireless power device in one example embodiment.

FIG. 5 is a diagram illustrating an implementation of over current protection in a wireless power device in one example embodiment. Descriptions of FIG. 5 may reference components shown in FIG. 1 to FIG. 4. The diagram in FIG. 5 illustrates an example embodiment of a wireless power receiver, such as receiver 120, implementing over current protection. The diagram shows the relationship between a current amplitude (A) and voltage amplitude (V) against time(s). In this example embodiment, the output current represented by waveform 305 is increasing while receiver 120 is still regulating output voltage 303 in dropout mode. Without a soft OCP trigger implemented, as seen in waveform 307, the output current represented by waveform 307 increases until it rises above hard OCP trigger 309. The output current may continue increasing while reducing the output voltage Vout caused by the hard OCP operation being triggered. With a soft OCP trigger and operation implemented, as seen in waveform 305, the output current represented by waveform 305 would be reduced to the maximum operating range 313. Then controller 122 would allow the output current to rise to the soft OCP threshold 311 before limiting the output current 305 back to the maximum operating range 313. The soft OCP operation allows receiver 120 to maintain the output current represented by waveform 305 between the soft OCP threshold 311 and the maximum of the operating range of Iout, thus preventing the difference between Vrect and Vout from increasing to an undesirable level and preventing thermal stress from increasing.

Figure 6:
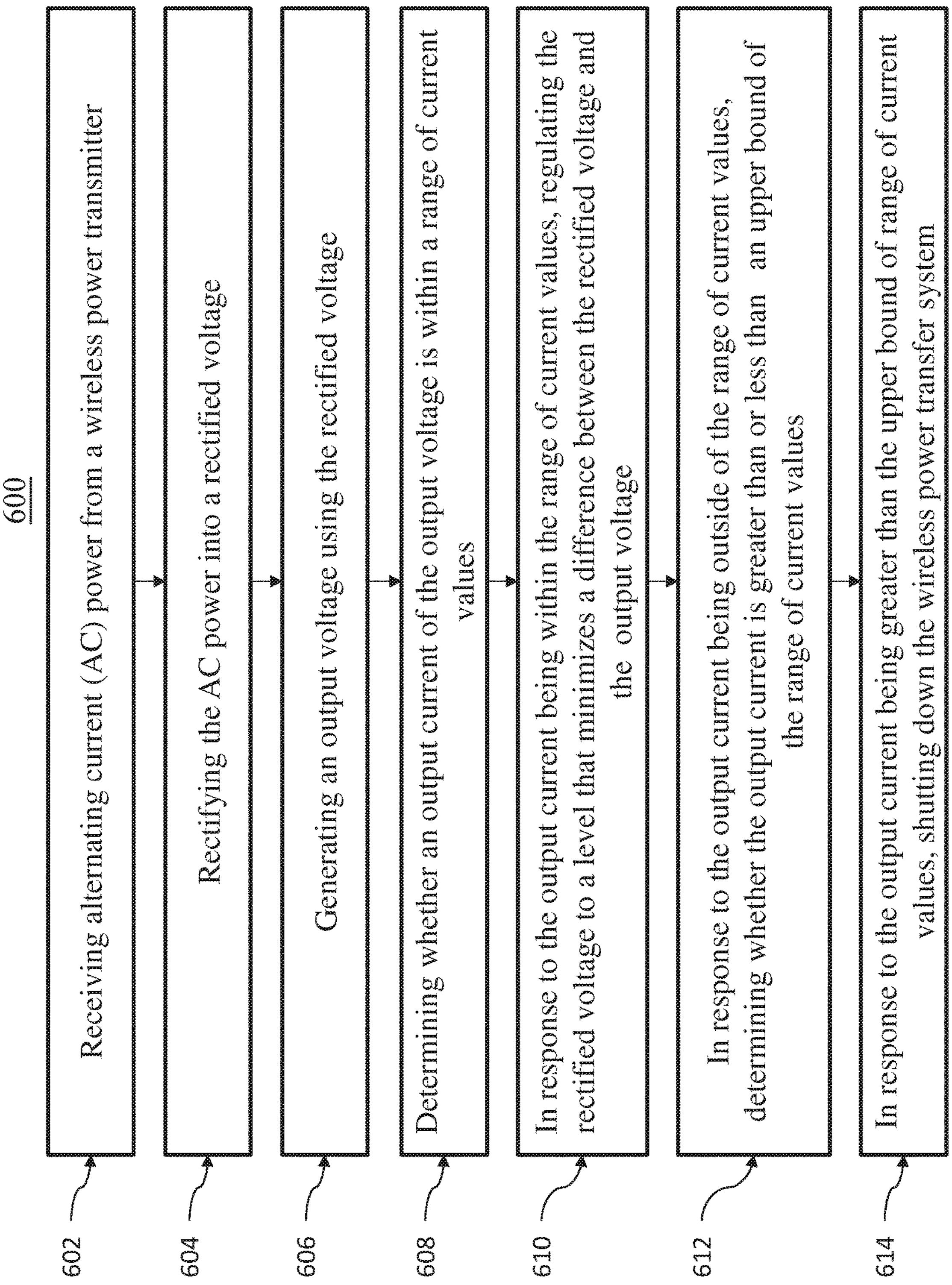
FIG. 6 is a flowchart illustrating the method implementing over current protection in wireless power devices.

FIG. 6 is a flowchart of an example process that can implement over current protection in wireless power devices in one embodiment. A process 600 in FIG. 6 may be implemented using, for example, system 100 discussed above. Process 600 can include one or more operations, actions, or functions as illustrated by one or more of blocks 602, 604, 606, 608, and/or 610. Although illustrated as discrete blocks, various blocks may be divided into additional blocks, combined into fewer blocks, eliminated, performed in different order, or performed in parallel, depending on the desired implementation.

Process 600 can be performed by a wireless power device, such as a receiver (receiver 120 described herein). Process 600 can begin at block 602. At block 602, the receiver can receive alternating current (AC) power from a wireless power transmitter. Process 600 can continue from block 602 to block 604. At block 604, the receiver can rectify the AC power into a rectified voltage. Process 600 can continue from block 604 to block 606. At block 606, the receiver can generate an output voltage using the rectified voltage. Process 600 can continue from block 606 to block 608. At block 608, the receiver can determine whether an output current of the output voltage is within a range of current values. Process 600 can continue from block 608 to block 610. At block 610, the receiver can, in response to the output current being within the range of current values, regulate the rectified voltage to a level that minimizes a difference between the rectified voltage and the output voltage. Process 600 can continue from block 610 to block 612. At block 612, the receiver can, in response to the output current being outside of the range of current values, determine whether the output current is greater than or less than an upper bound of the range of current values. Process 600 can continue from block 612 to block 614. At block 614, the receiver can, in response to the output current being greater than the upper bound of range of current values, shut down the wireless power transfer system.

In one embodiment, a lower bound of the range of current values is a predefined current value and the upper bound of the range of current values is a maximum of an operating range of the output current. In another embodiment, regulating the rectified voltage to the level that minimizes the difference between the rectified voltage and the output voltage comprises requesting less AC power from the wireless power transmitter.

In another embodiment, prior to determining whether an output current of the output voltage is within the range of current values, the receiver can determine a temperature of a wireless power receiver receiving the AC power exceeds a temperature threshold. In response to the temperature of the wireless power receiver exceeding the temperature threshold, the receiver can shut down the wireless power receiver. In another embodiment, the receiver can determine a control error packet (CEP) value based on the rectified voltage and the output current and regulating of the rectified voltage is based on the CEP value.

In another embodiment, regulating the rectified voltage further comprises determining a resistance threshold based on a lower bound of the range of current values and a predetermined target rectified voltage. Regulating the rectified voltage further comprises determining a system impedance based on the rectified voltage and the output current. Regulating the rectified voltage further comprises adjusting the rectified voltage based on a comparison between the measured system impedance and the resistance threshold.

In another embodiment, regulating the rectified voltage further comprises determining an offset between the predetermined target rectified voltage and a threshold voltage. The threshold voltage is based on the lower bound of the range of current values and the measured system impedance. Regulating the rectified voltage further comprises determining a mock target voltage based on the determined offset.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLES

Example 1: A method for operating a wireless power transfer system, the method comprising: receiving alternating current (AC) power from a wireless power transmitter; rectifying the AC power into a rectified voltage; generating an output voltage using the rectified voltage; determining whether an output current of the output voltage is within a range of current values; in response to the output current being within the range of current values, regulating the rectified voltage to a level that minimizes a difference between the rectified voltage and the output voltage; in response to the output current being outside of the range of current values, determining whether the output current is greater than or less than an upper bound of the range of current values; and in response to the output current being greater than the upper bound of range of current values, shutting down the wireless power transfer system.

Example 2: The method of example 1, wherein a lower bound of the range of current values is a predefined current value and the upper bound of the range of current values is a maximum of an operating range of the output current.

Example 3: The method of any one of examples 1 to 2, wherein regulating the rectified voltage to the level that minimizes the difference between the rectified voltage and the output voltage comprises requesting less AC power from the wireless power transmitter.

Example 4: The method of any one of examples 1 to 3, further comprising, prior to determining whether an output current of the output voltage is within the range of current values: determining a temperature of a wireless power receiver receiving the AC power exceeds a temperature threshold; and in response to the temperature of the wireless power receiver exceeding the temperature threshold, shutting down the wireless power receiver.

Example 5: The method of any one of examples 1 to 4, further comprising: determining a control error packet (CEP) value based on the rectified voltage and the output current, wherein regulating of the rectified voltage is based on the CEP value.

Example 6: The method of any one of examples 1 to 5, wherein regulating the rectified voltage further comprises: determining a resistance threshold based on a lower bound of the range of current values and a predetermined target rectified voltage; determining a system impedance based on the rectified voltage and the output current; and adjusting the rectified voltage based on a comparison between the determined system impedance and the resistance threshold.

Example 7: The method of any one of examples 1 to 6, wherein regulating the rectified voltage further comprises: determining an offset between the predetermined target rectified voltage and a threshold voltage, wherein the threshold voltage is based on the lower bound of the range of current values and the measured system impedance; and determining a mock target voltage based on the determined offset.

Example 8: An integrated circuit comprising: a controller; a circuit configured to: receive alternating current (AC) power from a wireless power transmitter; rectify the AC power into a rectified voltage; generate an output voltage using the rectified voltage; wherein the controller is configured to: determine whether an output current of the output voltage is within a range of current values; in response to the output current being within the range of current values, regulate the rectified voltage to a level that minimizes a difference between the rectified voltage and the output voltage; in response to the output current being outside of the range of current values, determine whether the output current is greater than or less than an upper bound of the range of current values; and in response to the output current being greater than the upper bound of range of current values, shut down a wireless power transfer system that includes the wireless power transmitter.

Example 9. The integrated circuit of example 8, wherein a lower bound of the range of current values is a predefined current value and the upper bound of the range of current values is a maximum of an operating range of the output current.

Example 10: The integrated circuit of any one of examples 8 to 9, wherein regulating the rectified voltage to the level that minimizes the difference between the rectified voltage and the output voltage comprises requesting less AC power from the wireless power transmitter.

Example 11: The integrated circuit of any one of examples 8 to 10, wherein, prior to determining whether an output current of the output voltage is within the range of current values, the controller is further configured to: determine a temperature of a wireless power receiver receiving the AC power exceeds a temperature threshold; and in response to the temperature of the wireless power receiver exceeding the temperature threshold, shut down the wireless power receiver.

Example 12: The integrated circuit of any one of examples 8 to 11, wherein the controller is further configured to: determine a control error packet (CEP) value based on the rectified voltage and the output current, wherein the regulation of the rectified voltage is based on the CEP values.

Example 13: The integrated circuit of any one of examples 8 to 12, wherein when regulating the rectified voltage, the controller is further configured to: determine a resistance threshold based on a the lower bound of the range of current values and a predetermined target rectified voltage; determine a system impedance based on the rectified voltage and the output current; and adjust the rectified voltage based on a comparison between the measured system impedance and the resistance threshold.

Example 14: The integrated circuit of any one of examples 8 to 13, wherein when regulating the rectified voltage, the controller is further configured to: determine an offset between the predetermined target rectified voltage and a threshold voltage, wherein the threshold voltage is based on the lower bound of the range of current values and the measured system impedance; and determine a mock target voltage based on the determined offset.

Example 15: A device comprising: a transmitter; a receiver, wherein the receiver comprises: a controller; a circuit configured to: receive alternating current (AC) power from the transmitter; rectify the AC power into a rectified voltage; generate an output voltage using the rectified voltage; wherein the controller is configured to: determine whether an output current of the output voltage is within a range of current values; in response to the output current being within the range of current values, regulate the rectified voltage to a level that minimizes a difference between the rectified voltage and the output voltage; in response to the output current being outside of the range of current values, determine whether the output current is greater than or less than an upper bound of the range of current values; and in response to the output current being greater than the upper bound of range of current values, shut down the wireless power transfer system.

Example 16: The device of example 15, wherein a lower bound of the range of current values is a predefined current value and the upper bound of the range of current values is a maximum of an operating range of the output current.

Example 17: The device of any one of examples 15 to 16, wherein regulating the rectified voltage to the level that minimizes the difference between the rectified voltage and the output voltage comprises requesting less AC power from the transmitter.

Example 18: The device of any one of examples 15 to 17, wherein, prior to determining whether an output current of the output voltage is within the range of current values, the controller is further configured to: determine a temperature of a wireless power receiver receiving the AC power exceeds a temperature threshold; and in response to the temperature of the wireless power receiver exceeding the temperature threshold, shut down the device.

Example 19: The device of any one of examples 15 to 18, wherein the controller is further configured to: determine a control error packet (CEP) value based on the rectified voltage and the output current, wherein the regulation of the rectified voltage is based on the CEP values.

Example 20: The device of any one of examples 15 to 19, wherein when regulating the rectified voltage, the controller is further configured to: determine a resistance threshold based on a the lower bound of the range of current values and a predetermined target rectified voltage; determine a system impedance based on the rectified voltage and the output current; and adjust the rectified voltage based on a comparison between the measured system impedance and the resistance threshold.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for operating a wireless power transfer system, the method comprising:

receiving alternating current (AC) power from a wireless power transmitter;

rectifying the AC power into a rectified voltage;

generating an output voltage using the rectified voltage;

determining whether an output current of the output voltage is within a range of current values;

in response to the output current being within the range of current values, regulating the rectified voltage to a level that minimizes a difference between the rectified voltage and the output voltage;

in response to the output current being outside of the range of current values, determining whether the output current is greater than or less than an upper bound of the range of current values; and in response to the output current being greater than the upper bound of the range of current values, shutting down the wireless power transfer system.

2. The method of claim 1, wherein a lower bound of the range of current values is a predefined current value and the upper bound of the range of current values is a maximum of an operating range of the output current.

3. The method of claim 1, wherein regulating the rectified voltage to the level that minimizes the difference between the rectified voltage and the output voltage comprises requesting less AC power from the wireless power transmitter.

4. The method of claim 1, further comprising, prior to determining whether an output current of the output voltage is within the range of current values:

determining a temperature of a wireless power receiver receiving the AC power exceeds a temperature threshold; and in response to the temperature of the wireless power receiver exceeding the temperature threshold, shutting down the wireless power receiver.

5. The method of claim 1, further comprising:

determining a control error packet (CEP) value based on the rectified voltage and the output current, wherein regulating of the rectified voltage is based on the CEP value.

6. The method of claim 1, wherein regulating the rectified voltage further comprises:

determining a resistance threshold based on a lower bound of the range of current values and a predetermined target rectified voltage;

determining a system impedance based on the rectified voltage and the output current; and adjusting the rectified voltage based on a comparison between the determined system impedance and the resistance threshold.

7. The method of claim 6, wherein regulating the rectified voltage further comprises:

determining an offset between the predetermined target rectified voltage and a threshold voltage, wherein the threshold voltage is based on the lower bound of the range of current values and the measured system impedance; and determining a mock target voltage based on the determined offset.

8. An integrated circuit comprising:

a controller; and a circuit configured to:

receive alternating current (AC) power from a wireless power transmitter;

rectify the AC power into a rectified voltage; and generate an output voltage using the rectified voltage, wherein the controller is configured to:

determine whether an output current of the output voltage is within a range of current values;

in response to the output current being within the range of current values, regulate the rectified voltage to a level that minimizes a difference between the rectified voltage and the output voltage;

in response to the output current being outside of the range of current values, determine whether the output current is greater than or less than an upper bound of the range of current values; and in response to the output current being greater than the upper bound of the range of current values, shut down a wireless power transfer system that includes the wireless power transmitter.

9. The integrated circuit of claim 8, wherein a lower bound of the range of current values is a predefined current value and the upper bound of the range of current values is a maximum of an operating range of the output current.

10. The integrated circuit of claim 8, wherein regulating the rectified voltage to the level that minimizes the difference between the rectified voltage and the output voltage comprises requesting less AC power from the wireless power transmitter.

11. The integrated circuit of claim 8, wherein, prior to determining whether an output current of the output voltage is within the range of current values, the controller is further configured to:

determine a temperature of a wireless power receiver receiving the AC power exceeds a temperature threshold; and in response to the temperature of the wireless power receiver exceeding the temperature threshold, shut down the wireless power receiver.

12. The integrated circuit of claim 8, wherein the controller is further configured to:

determine a control error packet (CEP) value based on the rectified voltage and the output current, wherein the regulation of the rectified voltage is based on the CEP values.

13. The integrated circuit of claim 8, wherein when regulating the rectified voltage, the controller is further configured to:

determine a resistance threshold based on a the lower bound of the range of current values and a predetermined target rectified voltage;

determine a system impedance based on the rectified voltage and the output current; and adjust the rectified voltage based on a comparison between the determined system impedance and the resistance threshold.

14. The integrated circuit of claim 13, wherein when regulating the rectified voltage, the controller is further configured to:

determine an offset between the predetermined target rectified voltage and a threshold voltage, wherein the threshold voltage is based on the lower bound of the range of current values and the measured system impedance; and determine a mock target voltage based on the determined offset.

15. A device comprising:

a transmitter; and a receiver comprising:

a circuit configured to:

receive alternating current (AC) power from the transmitter;

rectify the AC power into a rectified voltage; and generate an output voltage using the rectified voltage; and a controller configured to:

determine whether an output current of the output voltage is within a range of current values;

in response to the output current being within the range of current values, regulate the rectified voltage to a level that minimizes a difference between the rectified voltage and the output voltage;

in response to the output current being outside of the range of current values, determine whether the output current is greater than or less than an upper bound of the range of current values; and in response to the output current being greater than the upper bound of the range of current values, shut down the device.

16. The device of claim 15, wherein a lower bound of the range of current values is a predefined current value and the upper bound of the range of current values is a maximum of an operating range of the output current.

17. The device of claim 15, wherein regulating the rectified voltage to the level that minimizes the difference between the rectified voltage and the output voltage comprises requesting less AC power from the transmitter.

18. The device of claim 15, wherein, prior to determining whether an output current of the output voltage is within the range of current values, the controller is further configured to:

determine a temperature of a wireless power receiver receiving the AC power exceeds a temperature threshold; and in response to the temperature of the wireless power receiver exceeding the temperature threshold, shut down the device.

19. The device of claim 15, wherein the controller is further configured to:

determine a control error packet (CEP) value based on the rectified voltage and the output current, wherein the regulation of the rectified voltage is based on the CEP values.

20. The device of claim 15, wherein when regulating the rectified voltage, the controller is further configured to:

determine a resistance threshold based on a the lower bound of the range of current values and a predetermined target rectified voltage;

determine a system impedance based on the rectified voltage and the output current; and adjust the rectified voltage based on a comparison between the measured system impedance and the resistance threshold.

* * * * *